May 16, 1933.  H. AHOLA  1,909,445
PARACHUTE
Filed Nov. 23, 1931   3 Sheets-Sheet 1
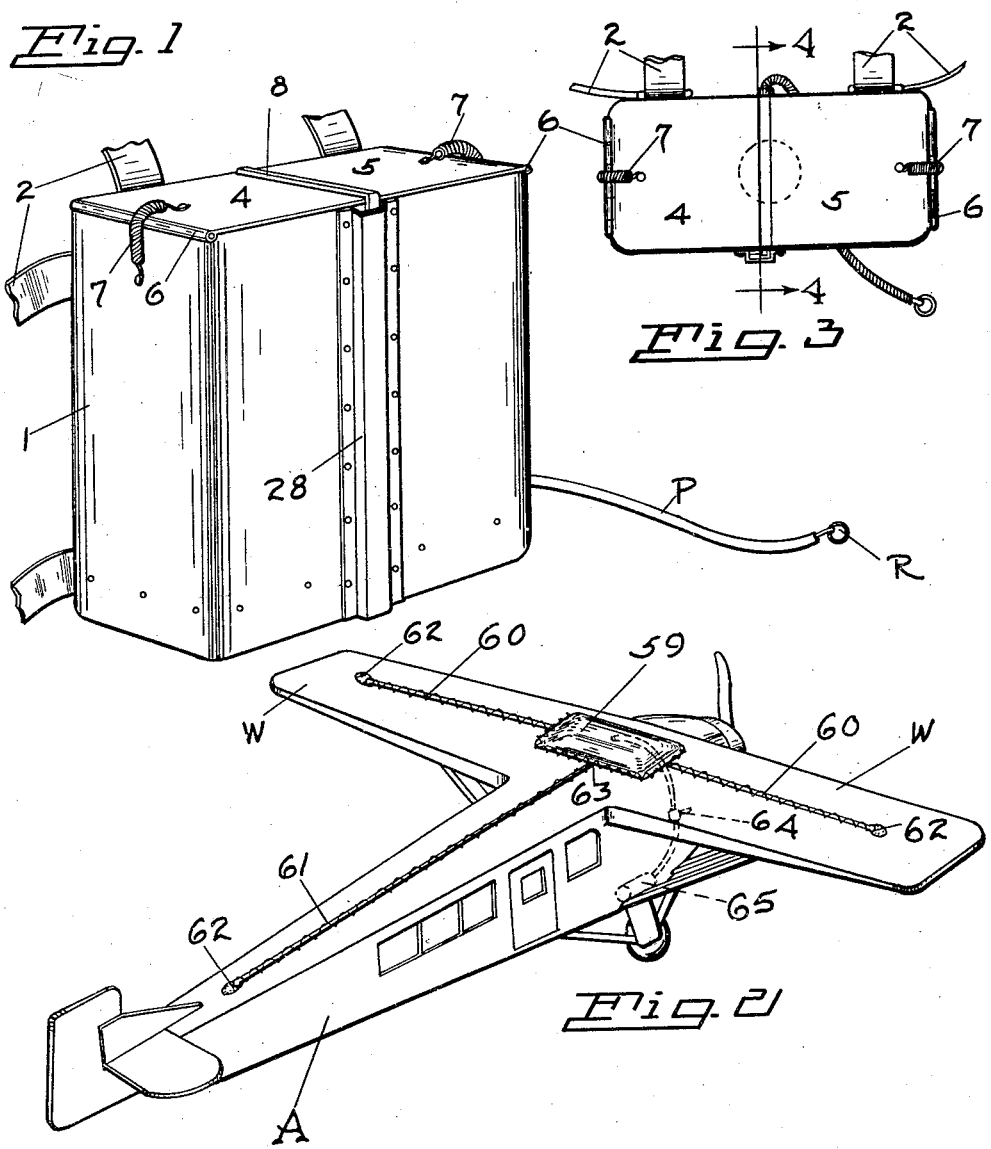
HAROLD AHOLA
*Inventor*
By *Herbert E. Smith*
*Attorney*

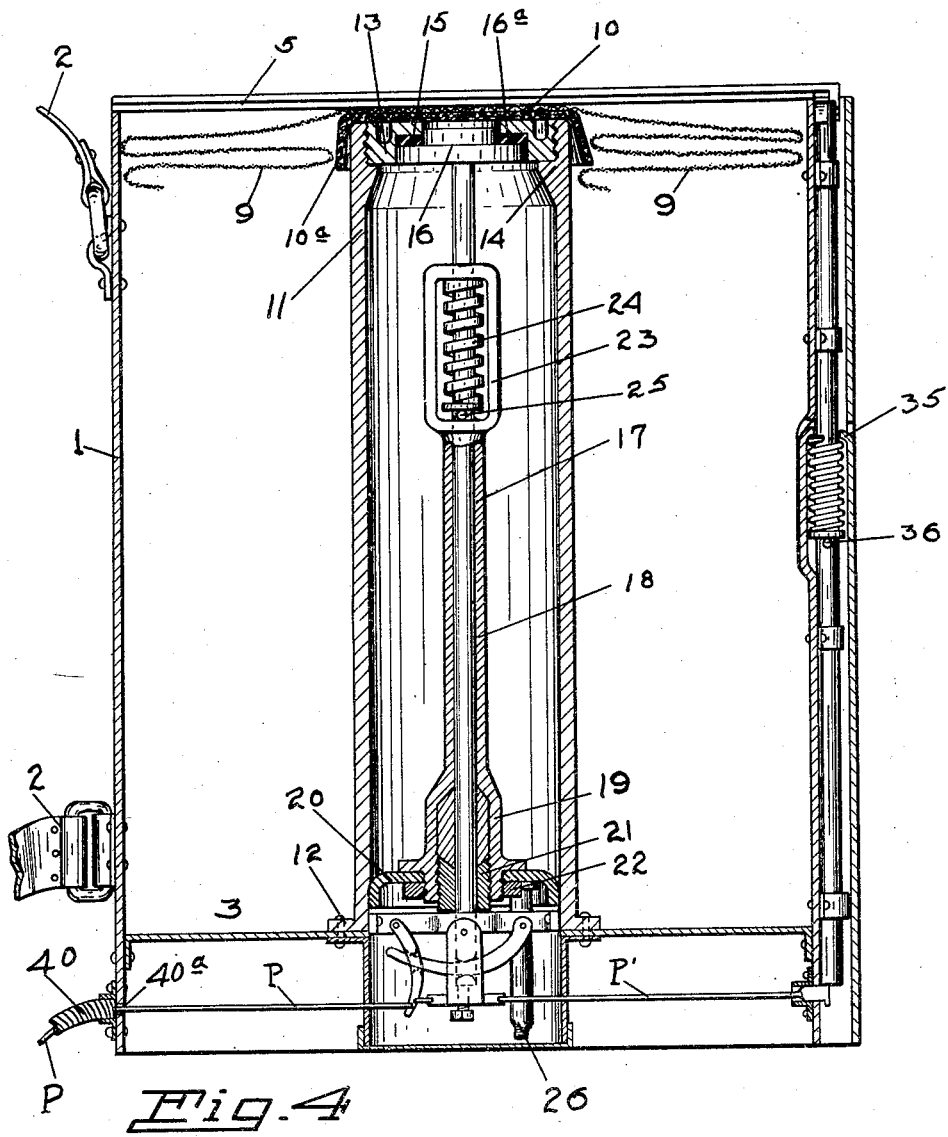
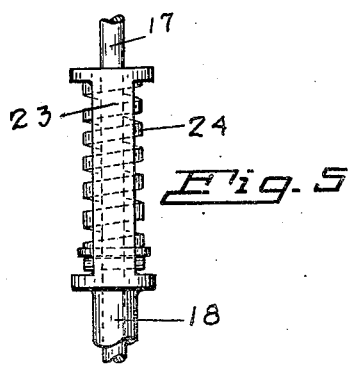

May 16, 1933.  H. AHOLA  1,909,445
PARACHUTE
Filed Nov. 23, 1931  3 Sheets-Sheet 3
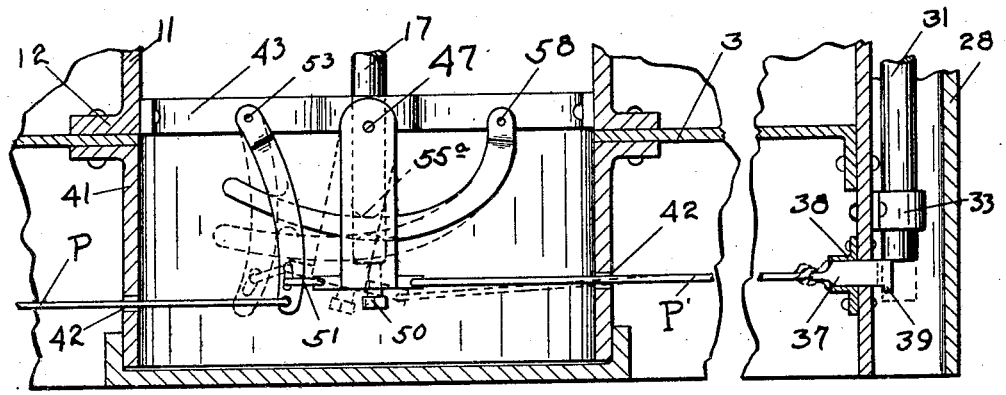
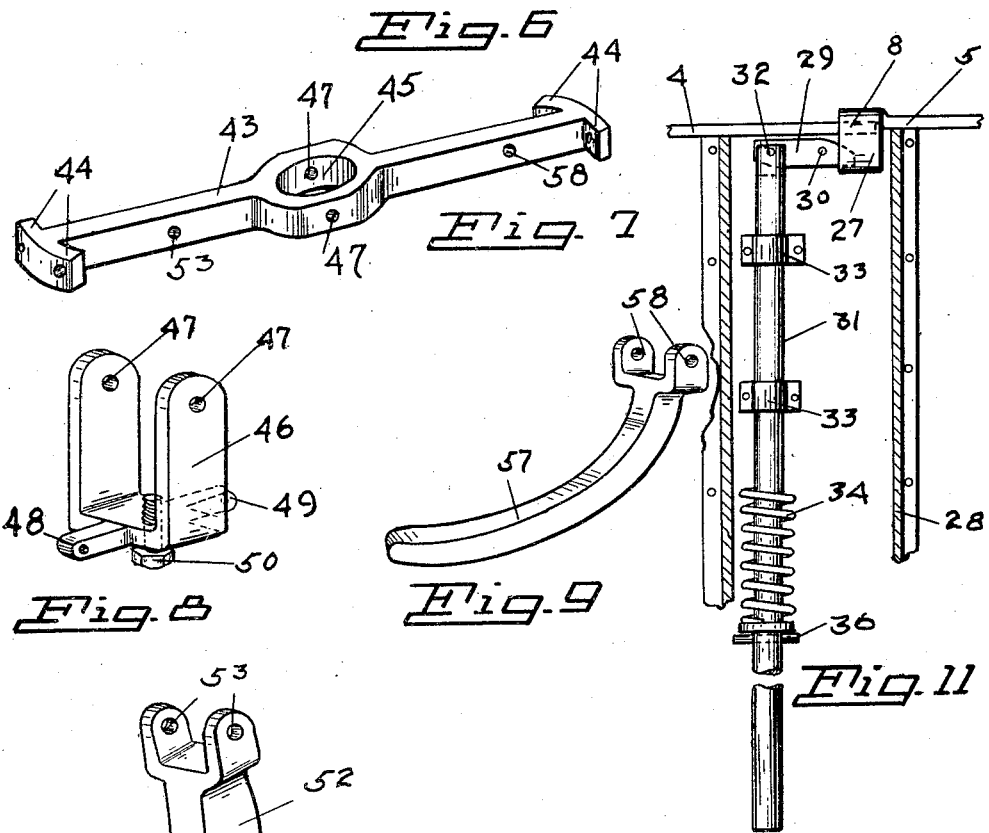
Harold Ahola
Inventor

Patented May 16, 1933

1,909,445

UNITED STATES PATENT OFFICE

HAROLD AHOLA, OF STEVENSON, WASHINGTON, ASSIGNOR OF ONE-HALF TO HAZEL B. TIDLAND, OF CAMAS, WASHINGTON, AS TRUSTEE

PARACHUTE

Application filed November 23, 1931. Serial No. 576,762.

My present invention relates to an improved parachute for use by aviators, aeronauts, and others, to descend safely from aircraft to the ground, when the necessity for such action is required. The parachute of my invention is also adapted for use with aircraft, to check the downward motion of the craft and provide for a safe landing of the craft, without oscillations during its descent. In the preferred form of the invention I have illustrated the parachute as it is adapted for use by aviators, aeronauts, and others, and the equipment involved in the invention is strapped on the back of the user, who employs the customary pull cord and ring at the proper time, after the jump, to release and permit expansion of the parachute.

The parachute is of the customary shape, or umbrella shape, and when collapsed is accurately packed in its container. When expanded or distended the parachute suspends the container, which is strapped to the user, in such manner as to permit the user to float and gradually descend through the air, to the ground.

The invention consists in certain novel combinations and arrangements of parts involving the container and its openable trapdoors or spring closed lids; pneumatically operated means for extending or expanding the parachute; actuating and operating means for releasing the trap doors and the parachute; and other features as will hereinafter be more fully pointed out in the claims.

In the accompanying drawings I have illustrated one complete example of the physical embodiment of my invention, where in the parts are combined and arranged according to the best mode I have thus far devised for the practical application of the principles of my invention, but it will be understood that changes and alterations may be made in the exemplified structure, within the scope of my claims, without departing from the principles of my invention.

Figure 1 is a perspective view of the equipment involving my invention, adapted for attachment to the back of the user, and the parts shown in collapsed or packed condition.

Figure 2 is a perspective view of a monoplane, or airship of the heavier than air type, equipped with the parachute of my invention.

Figure 3 is a top plan view of the equipment of Figure 1.

Figure 4 is an enlarged vertical sectional view of the casing and interior parts, showing the release mechanism, and taken at line 4—4 of Figure 3.

Figure 5 is a detail view of part of the spring device for opening the pneumatic valve to permit expansion of the parachute.

Figure 6 is an enlarged, detail sectional view at the lower central end of the container or casing showing the releasing devices for the pneumatic valve and trap doors.

Figure 7 is a perspective view of the suspending or supporting bar for operating parts, detached from the lower end of the air cylinder within the casing.

Figure 8 is a perspective view of a swinging yoke; Figure 9 is a perspective view of a swinging link; and Figure 10 is a perspective view of a swinging lever, suspended from the bar of Figure 7.

Figure 11 is a detail perspective view, partly in section, showing the releasing mechanism at the top of the container.

The container or casing 1 in which the parachute is housed, is preferably of rectangular shape and fashioned of light but strong material suitable for the purpose, and it is provided at one side with the usual straps 2 by means of which the equipment may be secured on the back of the user in customary or suitable manner. At the top of the casing are provided a pair of trap doors 4 and 5, and at the bottom of the casing, or elevated slightly therefrom, is a fixed bottom 3. The two trap doors 4 and 5 are hinged at 6 at the opposite top edges of the casing, to swing outwardly from the center, leaving the entire upper end of the casing unobstructed for passage therethrough of the parachute 9.

Each trap door is provided with a spring 7 anchored on the upper face of a door and also anchored at one of the narrow sides of the casing, and it will be apparent that when the doors are unfastened, or released, these springs immediately swing the trap doors upwardly and outwardly to uncover the top of the casing.

At their meeting edges one of the doors is provided with an overlapping flange 8, and this door, as will be described, is fastened in closed position, and by its overlapping flange retains the other door also in closed position.

The parachute 9 is shown collapsed, or folded, in loose layers and packed lightly within the casing, with its serrated or scalloped edges anchored in suitable manner to the casing. The parachute is fashioned in umbrella shape of suitable material that is of course flexible, and at its center, the parachute is fashioned with a reinforcing disk 10, that is securely attached at the under or inner side of the parachute. The disk 10 is of sufficient dimensions so that its edge or flange 10a may overhang the upper edge or end or an air cylinder 11, and thus center the parachute in its casing.

At its lower end, this air cylinder, which is located in upright position at the center of the casing, is flanged and bolted as at 12 to the elevated bottom 3 of the casing.

A screw cap 13, flush with the top of the cylinder, is threaded down against an interior shoulder or annular flange 14 of the cylinder, and this screw cap is fashioned with a centrally open, inner valve seat 15, which seat is closed by the valve head 16 and a usual gasket 16a.

The downwardly opening valve 16 is rigidly mounted at the upper end of the valve stem 17 which extends downwardly through the center of the air cylinder and is provided with a tubular guide 18 in which it is enclosed.

The tubular guide, at its lower end is fashioned with hollow attaching head 19 to which the flanged bottom 20 of the cylinder is rigidly attached, and the tubular guide and bottom 20 are rigid with the cylinder and immovable. A packing gland 21, and nut 22, the latter below the bottom of the cylinder, provide a non-leaking joint at the bottom of the air cylinder.

The valve is positively closed and opened, but it is assisted in its opening movement by the use of an open spring-housing 23 that encloses a spring 24 coiled about the valve stem and interposed between the upper end of the spring housing and a cotter pin 25 fixed transversely in the valve stem.

The air cylinder is normally filled to a suitable pressure with compressed air, introduced to its interior through the filling nipple 26 at the lower end of the cylinder, and when the trap doors and air valve are opened, the expansion of the compressed air as it rushes through the open valve seat or outlet port, impinges against the underside of the disk 10, and through this impingement, inflates and lifts the parachute to open position above the casing to which it is anchored, and of course the atmospheric pressure beneath the umbrella shaped parachute suspends the parachute and its load in position to make a gradual descent without oscillations.

The trap doors are released from fastened position, and the air valve is opened to inflate the parachute through the use of the pull cord P and the finger ring R at its end, these parts being arranged in readily accessible position for use.

For releasing the fastened doors and subjecting them to the opening action of the springs 7, 7, I employ a hasp 27 that is fashioned as a downward extension of the overlapping flange 8 of the door 5, and this hasp projects into the upper open end of a vertically arranged shield or tubular housing 28 attached at the exterior of the casing 1, and extending down to its bottom or lower end.

At the upper end of the housing or shield 28 a horizontally disposed latch-lever 29 is pivoted at 30 to the exterior face of the housing, and in position so that its free end may engage in the hasp 27 as best seen in Figure 11. The other end of this latch lever 29 is pivoted to a slide bolt 31 at its upper end 32, and this bolt, extending downwardly through the shield 28 is guided by and adapted to slide in bearings 33 secured to the outer face of the casing 1. The bolt is positively held in up position to retain the trap doors in fastened and closed position, but is spring pressed in downward direction to detach the catch-lever 29 from the hasp 27 by means of a spring 34 coiled about the bolt, and interposed between a flange 35 of the shield and a transversely arranged pin 36 in the bolt.

The bolt is released by the withdrawal of a horizontally disposed slide pin 37, movable in bearings 38 in a wall of the casing, and a stop lug 39 prevents excessive movement of the slide pin. As best seen in Figure 6 the pin projects sufficiently into the shield to permit the lower end of the bolt to rest upon it, but when the pin is withdrawn from beneath the bolt, the latter is projected downwardly, as indicated by dotted lines.

The release cord or pull cord P, for a portion of its length, is encased in an armored tube 40 exterior of the casing, and the cord passes through an opening 40a in the wall of the casing 1 thence through the open casing below the elevated bottom 3 and through the wall of a housing 41 which is provided with holes 42.

The housing or enclosure 41 is bolted at the underside of the elevated bottom of the casing and conforms to the size and shape of the air cylinder, above the elevated bottom, and the operating parts of the releasing devices are suspended in this housing from a suspending bar 43.

The suspending bar 43 is provided with attaching lugs 44 at its opposite ends, and these are rigidly secured within the lower end of the air cylinder, below the lower cylinder head 20. At its center the suspending bar is fashioned with an open ring 45 through which the lower end of the valve stem 17 projects and is movable. A swinging, U-shaped yoke 46 is pivoted at 47 to the wall of the ring 45 of the cross bar 43 and hangs below the bar, normally in alinement with the valve stem, and at one side the yoke is provided with a perforated lug 48 while at its other side a similar lug 49 is fashioned. A set bolt 50 is threaded upwardly through the bottom of the yoke in alinement with the valve stem, and the latter normally rests with its lower end on this screw.

A coupling link 51 connects the lug 48 of the yoke with the lower end of a lever 52 that is pivoted at 53 on the suspension bar 43, and the inner end of the pull cord P is connected, to the free end of this lever. A shorter pull cord P' is connected between the perforated lug 49 of the swinging yoke and the slide pin 37. The lever is slotted as at 54 Figure 10 for the accommodation of the coupling link, and it will be apparent that a pull on the cord P is transmitted through the yoke to the slide pin, as indicated in Figure 6.

Above the slot 54 (Figure 10) the lever 52 is fashioned with a second slot 55 having complementary convex bearing faces or walls 56, and a link 57, pivoted at 58 on the suspending bar, has its free end passed through this latter slot 55. This curved link also passes through a slot 55a in the lower end of the valve stem 17, within the yoke 46. Thus, it will be seen that a pull on the pull cord P swings the lever 52 to the left in Figure 6, and the frictional engagement of this slotted lever with the link 47 pulls down the valve stem to open the air valve. The same outward swing of the lever 52, through the coupling link 51 swings the yoke to the left, withdrawing the set bolt from beneath the lower end of the valve stem, and the pull of the yoke also withdraws the slide pin from beneath the door bolt 31, the parts moving as indicated by dotted lines in Figure 6. After the parachute has been used, the parts are again restored to their normal positions for future use.

In Figure 2 an airplane is indicated as A with wings W, and a parachute equipment, according to my invention, is applied thereto, the parachute being indicated at 59 in collapsed or packed condition and openable upwardly above the top of the airplane. Three suspending cables are indicated at 60, 60 and 61, anchored as at 62 to the airplane and as at 63 to the parachute, and the release lever 64 and pneumatic expander for the parachute 65 are indicated by dotted lines. The release lever 64 is located in the pilot's cockpit, readily accessible for use, and the parachute and airplane are so related as to permit the parachute, when extended, to float the ship to the ground. The container for the parachute is provided with the same or modified doors as used on the casing 1, and the operating parts perform their functions in substantially the same manner as in the equipment previously described in detail.

Having thus fully described my invention, what I claim as new and desire to secure by Letters Patent is:—

1. The combination in a parachute-opening mechanism with a compressed air cylinder having an outlet valve and stem, of a spring device for opening the valve, a fastening device for the valve comprising a pivoted yoke for co-action with the stem, a pivoted lever and a pull cord connected thereto, a pivoted link jointly co-acting with said stem and lever, and a coupling between the yoke and lever.

2. The combination in a parachute-opening mechanism with an air valve and its stem, of a pivoted yoke co-acting with the stem for retaining the valve in closed position, a pull cord and a pivoted lever connected therewith, a pivoted link passing through slots in the stem and lever, and a coupling connection between the yoke and lever.

3. The combination with a pair of spring-opened doors and a casing, of door fastening means comprising a hasp on one of the doors, a pivoted latch-lever engaging the hasp, a spring actuated bolt pivotally connected with the lever, a slide pin for co-action with the free end of the bolt, and means for withdrawing said pin from engagement with the bolt.

4. The combination with a casing and a pair of spring-opened hinged-doors, one of said doors having an edge flange overlapping the other door, a hasp forming an extension of said flange, a pivoted latch lever engaging the hasp, a spring actuated slide bolt pivotally connected with the lever, a slide pin at the free end of said bolt for holding the bolt in closed position, and means for withdrawing said pin from engagement with the bolt.

5. The combination in a parachute opening mechanism with a casing and a central air cylinder therein having an outlet valve, of a parachute having a central reinforcing disk over the valved end of the cylinder and folded in collapsed position about the cylinder, means for retaining the valve in closed position, and means for releasing the outlet valve for the purpose of inflating and projecting the parachute from the casing.

In testimony whereof I affix my signature.

HAROLD AHOLA.